United States Patent [19]

Lanius

[11] Patent Number: 4,651,458
[45] Date of Patent: Mar. 24, 1987

[54] DUAL POSITION BIRD DECOY

[75] Inventor: Charles A. Lanius, Prairie du Sac, Wis.

[73] Assignee: Flambeau Corporation, Baraboo, Wis.

[21] Appl. No.: 812,799

[22] Filed: Dec. 23, 1985

[51] Int. Cl.⁴ ............................................. A01M 31/06
[52] U.S. Cl. ............................................ 43/3; 446/99; 446/100
[58] Field of Search ..................... 43/2, 3; 446/99, 100

[56] References Cited
U.S. PATENT DOCUMENTS

| | | | |
|---|---|---|---|
| 2,174,211 | 9/1939 | Hutoff | 43/3 |
| 2,545,800 | 3/1951 | Viken | 43/3 |
| 3,350,808 | 11/1967 | Mitchell | 43/3 |
| 3,478,459 | 11/1969 | Gagalski | 43/3 |
| 3,939,591 | 2/1976 | Schwartztrauber | 43/3 |

Primary Examiner—Nicholas P. Godici
Assistant Examiner—Karen Skillman
Attorney, Agent, or Firm—Allegretti, Newitt, Witcoff & McAndrews, Ltd.

[57] ABSTRACT

A bird decoy which can be assembled in either a feeder or sentry position. The decoy includes separate main body, neck, and head portions. The neck includes first and second ends. The main body engages one of the neck ends, and the head engages another of the neck ends. With the first end of the neck interconnected to the body and second end interconnected to the head, the neck curves to a lower portion to simulate a feeding goose. With the second end of the neck interconnected to the body and the first end interconnected to the head, the neck is substantially upright, to sumulate a bird in a sentry position.

11 Claims, 11 Drawing Figures

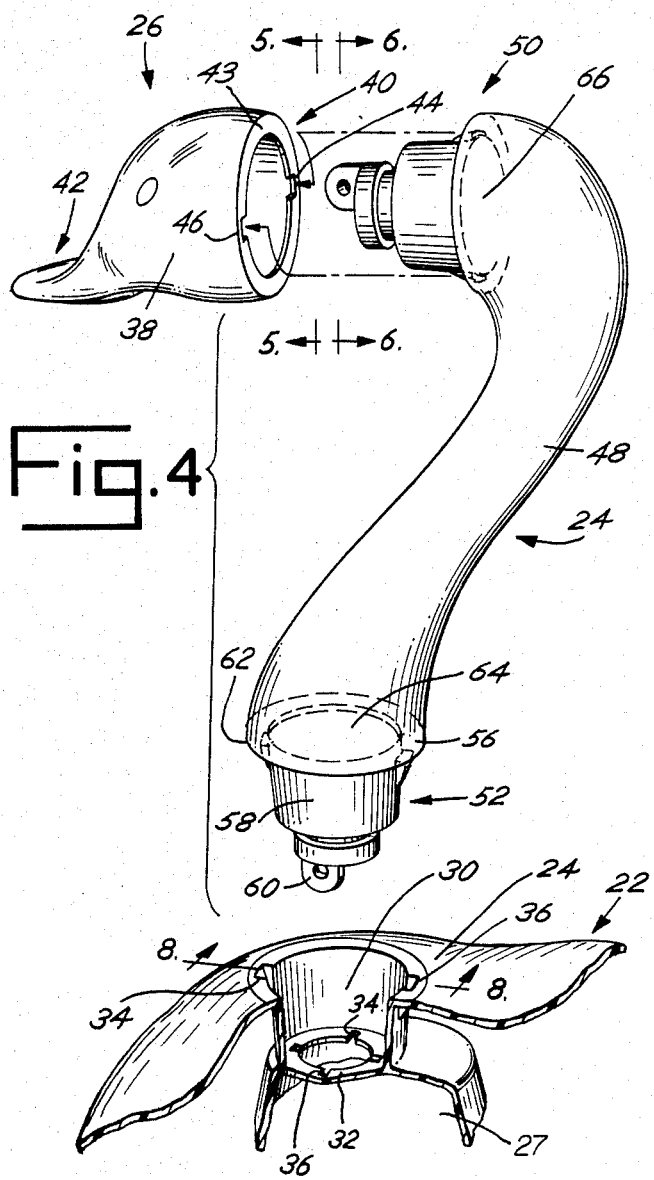
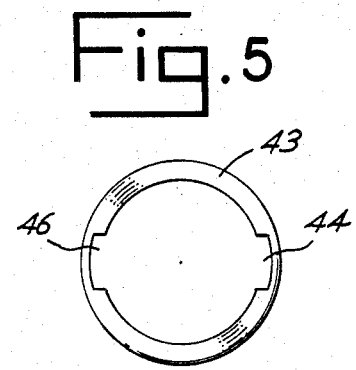
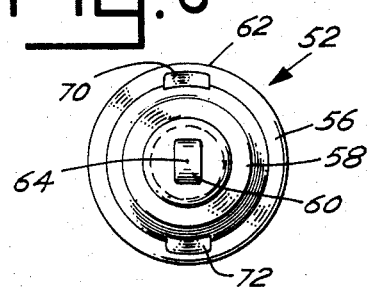
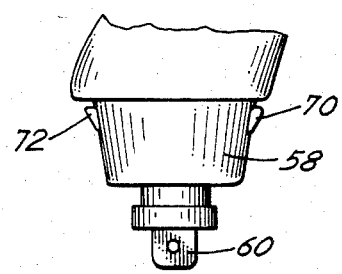
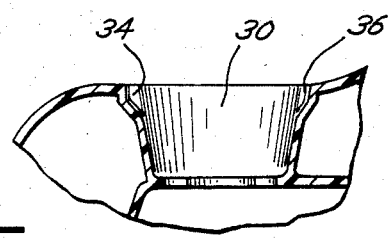

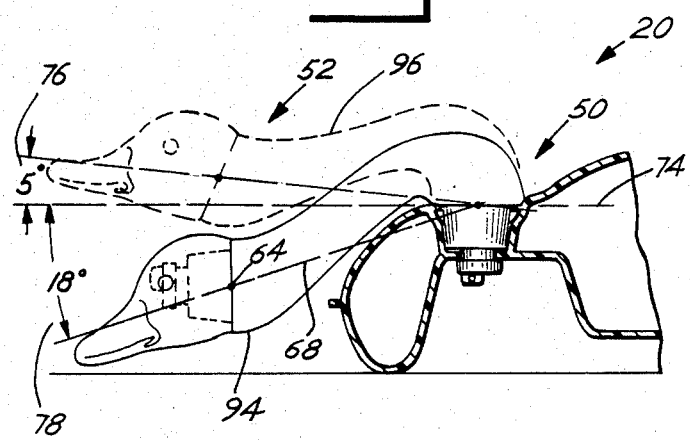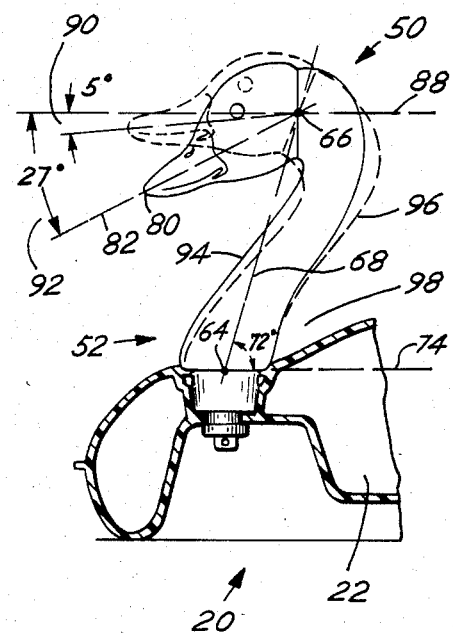

DUAL POSITION BIRD DECOY

BACKGROUND OF THE INVENTION

Goose hunters often set out a collection of decoys. If the decoys are properly made and arranged, geese flying overhead may be attracted to the area. A proper, natural-looking arrangement of decoys, however, requires that some geese in the flock have their heads and necks lowered, in a "feeding position," to emulate geese gathering food from the surface of the ground or water. A smaller portion of the flock should have their heads and necks raised well above their bodies, in a "sentry position", resembling geese that are looking for indications of danger.

Most decoys, however, only portray geese in a single position. Thus, the decoy manufacturers must make and sell two different types of decoys: both "feeders" and "sentries." Consequently, there are fewer economies of scale for the manufacturer than if only one type of decoy was necessary. Thus, the price of decoys is increased.

Moreover, hunters in the field may wish to vary the positions of decoys in the feeder and sentry positions. With single-position decoys, however, a hunter in the field may not easily change the feeder/sentry proportions. To change the makeup of the decoy flock, the hunter must be willing to either decrease the size of the decoy gaggle or to bring extra decoys into the field with him.

SUMMARY OF THE INVENTION

In a principal aspect, the present invention is an improved bird decoy having a separate main body, neck and head. The neck includes two ends. One end is engaged by the main body and the other is engaged by the head. By changing which of the ends is engaged by the main body, the decoy will assume a realistic representation of geese in either the feeder or sentry positions.

In another principal aspect of the present invention, a more realistic position of a goose in the feeder or sentry positions is achieved by controlling the angular relation between the two ends of the neck. Thus, for example, the first and second ends of the neck each define centerpoints and an orientation line between them. When the main body of the decoy receives the first end of the neck and the decoy is thus in a feeder position, the orientation line of the neck is no more than 18° below a horizontal plane, but no more than 5° above the horizontal plane.

Accordingly, an object of the present invention is an improved bird decoy that may more easily assume both feeder and sentry positions. Another object is a bird that is more economical to manufacture, since both feeder and sentry decoys may be made with the same manufacturing equipment. Still another object is an improved bird decoy that will allow a hunter in the field to more easily change the proportion of feeder and sentry decoys that are being used.

These and other objects, features, and advantages of the present invention are discussed or apparent in the following detailed description.

BRIEF DESCRIPTION OF THE DRAWING

A preferred embodiment of the present invention is described herein with reference to the drawing wherein:

FIG. 4 is a partial perspective view of the preferred embodiment shown in FIG. 1;

FIG. 5 is a rear view of the head portion of the preferred embodiment shown in FIG. 4, as viewed substantially along the line 5—5;

FIG. 6 is a partial front view of the neck portion of the preferred embodiment shown in FIG. 4, as viewed substantially along the line 6—6;

FIG. 7 is a partial side view of the neck portion of the preferred embodiment shown in FIG. 4;

FIG. 8 is a partial cross sectional view of the main body for the preferred embodiment shown in FIG. 4, as viewed substantially along the line 8—8;

FIG. 9 is a left side cross sectional view of the preferred embodiment shown in FIG. 2, showing the approximate range of angular positions for the neck portion when in the feeder position;

FIG. 10 is a left side cross sectional view of the preferred embodiment shown in FIG. 2, showing the approximate range of angular positions for the head portion when in the feeder position; and FIG. 11 is a left side cross sectional view of the preferred embodiment shown in FIG. 1, showing the approximate range of angular positions for the head portion when in the sentry position.

DETAILED DESCRIPTION

Figure 1:
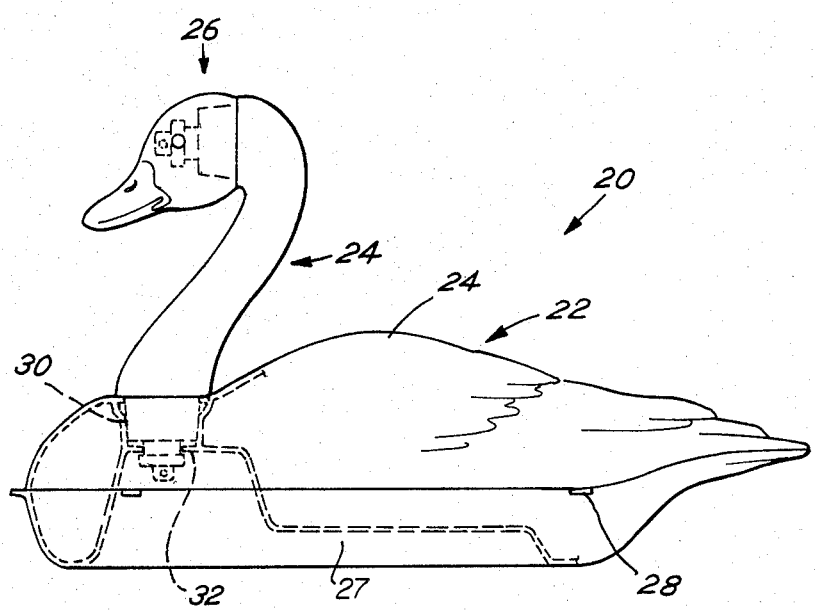
FIG. 1 is a left side view of a preferred embodiment of the present invention, showing a decoy is a sentry position.

Referring to FIGS. 1-11, a preferred embodiment of the present invention is shown as a decoy 20 having a main body 22, neck 24 and head 26. The body 22 is comprised of blow-molded plastic and includes a top 24, bottom recess 27, tie-down tabs 28, and a neck aperature 30.

The body 22 may be placed on either land or water. When placed on water, the recess 27 makes the decoy more stable and less likely to be rolled over by waves. When on land, the recess 27 allows the decoy to more easily be positioned in level position, even though the surface of the ground is irregular.

In addition, slender rods or stakes (not shown) may be pushed through the tabs 28 and into the ground. Thus, the stakes help the decoy 20 stay in place, even if a wind should blow against it.

As shown in FIGS. 1 and 4, the neck aperture 30 of the body extends from the top 24 to the bottom recess 27. The aperture 30 includes a lip 32 and two body slots therein 34, 36. As in obvious to those of ordinary skill in the art, the two body slots 34 and 36 can also be made as wide as desired so as to allow the neck 24 to be placed within the aperture 30 and thereafter be swiveled within the aperture 30.

The head 26 is made of blow-molded plastic and includes an exterior surface 38 and an attachment collar 40. The exterior surface 38 simulates a natural goose's head and includes, for example, a goose bill 42. The collar includes a lip 43 having two radially disposed head slots therein 44, 46.

Figure 3:
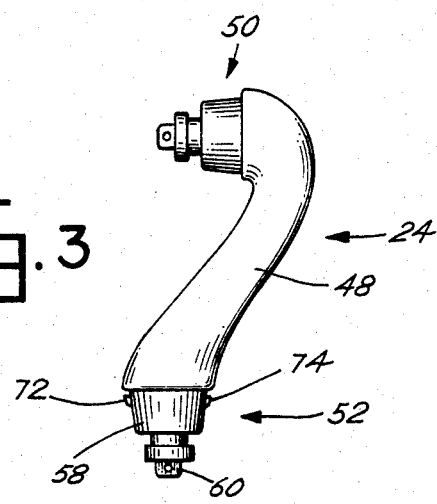
FIG. 3 is a side view of the neck portion of the preferred embodiment shown in FIG. 1.

The neck 24 is also made of blow-molded plastic and includes a smooth intermediate section 48 separating first and second ends 50, 52. The intermediate section 48 has a substantially smooth exterior surface to resemble a goose's neck. As shown in FIG. 3, the intermediate section 48 is roughly "S" shaped. The angular configuration of the neck 24, which allows the same decoy to assume both feeder and sentry positions, is discussed in further detail below.

The first and second ends 50, 52 are each comprised of substantially the same type of elements. Thus, only the second end 52 is discussed below for illustrative purposes. The second end 52 includes a collar 56, a tapered insert 58, and an anchor rope ring 60 extending therefrom.

The collar 56 of the end 52 is substantially flat and its outer surface substantially defines a circle 62. See FIG. 6. The center of the circle 62 of the second end 52 defines a second centerpoint 64.

Similarly, the center of the first end 50 defines a first centerpoint 66. As shown in FIGS. 9-11, the two centerpoints 64, 66 define an orientation line 68 for the neck 24.

The tapered insert 58 includes two radially opposed nubs 70, 72 extending therefrom, approximately ¼ inch below the collar 56. The nubs 70, 72 are dimensioned to be received by either the two head slots 44, 46 or the two body slots 34, 36. Accordingly, one of the ends 50, 52 may be inserted into either the head 26 or body 22 of the decoy 20, and the tapered insert 58, with the two nubs 70, 72, holds the head 26 or body 22 firmly thereon. One end of a rope (not shown) may easily be tied to the ring 60. Thus, when the decoy 20 is placed on water, the rope tied between the decoy 20 and an anchor (not shown) will prevent the decoy 20 from floating away from a desired position.

Figure 2:
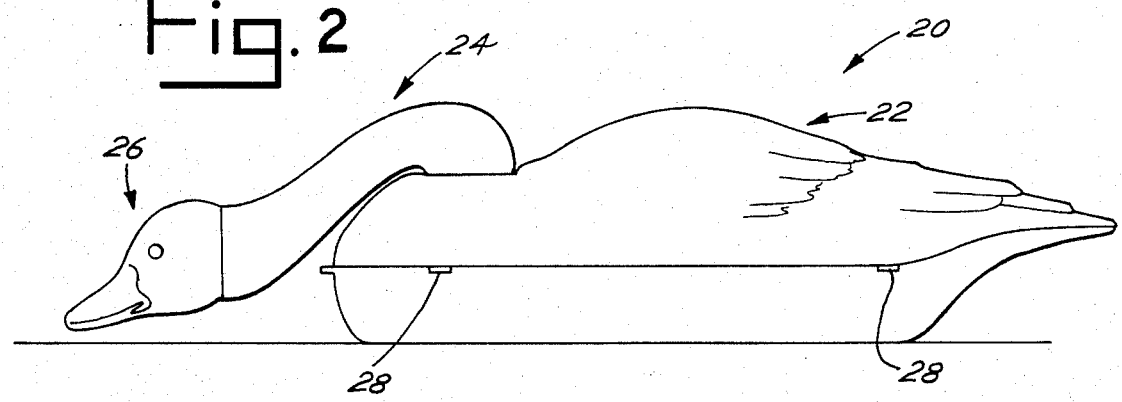
FIG. 2 is a left side view of the preferred embodiment shown in FIG. 1, showing the decoy is a feeder position.

Applicant has noted that careful control over the angular configuration of the neck 24 and head 26 allows the same decoy 20 to assume a realistic feeder or sentry position. When the first end 50 is inserted into the body 22 (and the second end 52 inserted into the head 26) as shown in FIG. 2, the decoy 20 assumes the feeder position. Conversely, when the second end 52 is inserted into the body 22 (and the first end 50 is entered into the head 26) then the decoy 20 assumes the sentry position, as shown in FIG. 1. To achieve such a dual position decoy 20, however, the angular configuration of the neck 24 should be controlled.

Applicant has noted, for example, that a more realistic dual position decoy 20 is achieved if the neck and head lie substantially within ranges of angular configuration shown in FIGS. 9-11. Applicant has also noted that, when the decoy 20 is in a feeder position, a preferred result is achieved if the orientation line 68 of the neck 24 bears a predetermined relation to an imaginary, substantially horizontal plane 74.

As shown in FIG. 9, in the most preferred embodiment, the orientation line 68 bears an angle 76 of no more than 5° above the horizontal plane 74 nor an angle 78 more than 18° below the horizontal line. In the most preferred embodiment used by applicant, the orientation line 68 of the neck 24, as shown in FIGS. 2 and 3, is approximately 18° below a horizontal plane.

The head 26 of the most preferred embodiment also has a predetermined angular relation to the horizontal plane 74. As shown in FIG. 10, the bill 42 defines an area 80 that is substantially perpendicular to an imaginary bill line 82 between the first centerpoint 66 and the bill 42. In the most preferred embodiment, the imaginary bill line 82 bears an angle 84 of no more than 3° above the horizontal plane 74 and an angle 86 of no more than 22° below the horizontal plane. In the most preferred embodiment used by applicant, as shown in FIG. 2, the imaginary bill line 82 is approximately 20° below a horizontal plane.

Similarly, when the decoy 20 is in the sentry position, with the second end 52 inserted into the body 22, the bill line 82 between the centerpoint 62 of the first end 50 and the perpendicular area 80 of the bill 42 should again bear a predetermined relation to a horizontal plane 88. In the most preferred embodiment, the bill line 82 bears an angle 90 of at least 5° below the horizontal plane 74 and no more than an angle 92 of 27° below the horizontal plane 74. In the most preferred embodiment used by applicant, as shown in FIG. 1, the bill line 82 is approximately 26° below a horizontal plane.

In FIGS. 9 and 10, two different types of necks 94, 96 are shown, in which the orientation line 68 bears two different angles to the horizontal plane 74. Both of these same necks are shown in FIG. 11, as well. As shown in FIG. 11, the orientation line 68 of both necks 94, 96, when in the sentry position, bears an angle 98 of approximately 72° from the horizontal plane 74.

A preferred embodiment of the present invention has been described herein. It is to be understood, however, that changes and modifications can be made without departing from the true scope and spirit of the present invention. This true scope and spirit are defined by the following claims and their equivalents, to be interpreted in light of the foregoing specification.

I claim:

1. A bird decoy that may assume both feeder and sentry positions comprising, in combination:
   a substantially rigid, reversible, curved neck having first and second ends;
   a main body having a top side;
   a fixed aperture within said top side of said main body for receiving one of said ends of said neck; and
   a head with attachment means for engaging one end of said neck, whereby said body may engage said first end and said head may engage said second end to have said decoy assume said feeder position and whereby said body may engage said second end and said head may engage said first end to have said decoy assume said sentry position.

2. A bird decoy that may assume both feeder and sentry positions comprising, in combination:
   a substantially rigid, reversible, curved neck having first and second ends that each define, respectively, first and second centerpoints and an orientation line therebetween;
   a main body having a top side;
   a fixed aperture within said top side of said main body for receiving one of said ends of said neck, said attachment means of said main body receiving said first end of said neck and said orientation line of said neck being no more than about 18° below a horizontal plane and no more than about 5° above said horizontal plane; and
   a head with attachment means for engaging said second end of said neck.

3. A bird decoy as claimed in claim 2 wherein said head includes a bill having an exterior surface, said bill defining a bill centerline between said bill and said first centerpoint of said first end of said neck, said exterior surface of said bill being substantially orthogonal to said bird centerline where said centerline intersects said exterior surface.

4. A bird hunting decoy as claimed in claim 3 wherein said bill centerline is no more than about 22° below said horizontal plane and no more than about 3° above said horizontal plane.

5. A bird decoy as claimed in claim 4 wherein said first and second ends of said neck each include a protrusion and said attachment means of said main body and head each include a socket for grippingly engaging at least one of said protrusions.

6. A bird hunting decoy as claimed in claim 5 wherein said neck, main body and head are each comprised of blow-molded plastic.

7. A bird decoy that may assume both feeder and sentry positions comprising, in combination:
- a substantially rigid, reversible, curved neck having first and second ends that each define, respectively, first and second centerpoints and an orientation line therebetween;
- a main body defining forward and reward positions and having a top side;
- a fixed aperture within said top side of said main body for receiving one of said ends of said neck, said attachment means of said main body receiving said second end of said neck and said orientation line of said neck being in the order of about 70° from a horizontal plane; and
- a head for engaging said second end of said neck.

8. A bird decoy as claimed in claim 7, wherein said head includes a bill having an exterior surface, said bill defining a bill centerline between said bill and said first centerline of said first end of said neck, said exterior surface of said bill being substantially orthogonal to said bill centerline where said centerline intersects said exterior surface.

9. A bird decoy as claimed in claim 8 wherein said bill centerline is no less than about 5° below a horizontal plane and no more than about 27° below said horizontal plane.

10. A bird decoy as claimed in claim 9 wherein said first and second ends of said neck each include a protrusion and said attachment means of said main body and head each include a socket for grippingly engaging at least one of said protrusions.

11. A bird hunting decoy as claimed in claim 11 wherein said neck, main body and head are each comprised of blow-molded plastic.

* * * * *